United States Patent
Garcia

(10) Patent No.: US 8,527,397 B2
(45) Date of Patent: Sep. 3, 2013

(54) ONLINE AUTOMATED SOFTWARE APPLICATION FOR MATCHING INVESTORS AND TRADERS TO CREATE RISK CONTROLLED INVESTMENT ACCOUNTS

(75) Inventor: Jose A. Garcia, North Miami, FL (US)

(73) Assignee: E Tech Money, Inc, North Miami, FL (US)

( * ) Notice: Subject to any disclaimer, the term of this patent is extended or adjusted under 35 U.S.C. 154(b) by 0 days.

(21) Appl. No.: 13/488,362

(22) Filed: Jun. 4, 2012

(65) Prior Publication Data

US 2012/0310812 A1  Dec. 6, 2012

Related U.S. Application Data

(60) Provisional application No. 61/493,292, filed on Jun. 3, 2011, provisional application No. 61/493,297, filed on Jun. 3, 2011.

(51) Int. Cl.
*G06Q 40/00* (2012.01)

(52) U.S. Cl.
USPC .............................................. 705/37; 705/35

(58) Field of Classification Search
USPC ...................................................... 705/35, 37
See application file for complete search history.

(56) References Cited

U.S. PATENT DOCUMENTS 8,086,527 B2 * 12/2011 Bauerschmidt et al. ........ 705/38

* cited by examiner

*Primary Examiner* — Ojo O Oyebisi
(74) *Attorney, Agent, or Firm* — Sinorica, LLC

(57) ABSTRACT

A method for an Internet-based software application is used to match specific investors to specific traders and traders' systems by running a set of compatibility algorithms. The compatibility algorithms identify similar qualities between investors and traders and compiles a list of high-incidence matches. Such qualities for the investors include investment tendencies and risk-tolerance criteria, and such qualities for the traders include trading tendencies. The software application will allow a specific investor(s) and a specific trader to broker a trade agreement that will accommodate the requirements for both parties. The software application will also allow a specific investor to implement a risk management strategy, which can be done in, but not limited to, four embodiments: the risk-control embodiment, the risk-control-with-pooling embodiment, the risk-transfer embodiment, and the risk-transfer-with-pooling embodiment.

9 Claims, 9 Drawing Sheets

ONLINE AUTOMATED SOFTWARE APPLICATION FOR MATCHING INVESTORS AND TRADERS TO CREATE RISK CONTROLLED INVESTMENT ACCOUNTS

The current application claims a priority to the U.S. Provisional Patent application Ser. No. 61/493,292 filed on Jun. 3, 2011 and U.S. Provisional Patent application Ser. No. 61/493,297 filed Jun. 3, 2011. The current application filed in U.S. Jun. 4, 2012 while Jun. 3, 2012 was on a weekend.

FIELD OF THE INVENTION

The present invention relates generally to an online automated Internet-based software application for financial trading activity. More specifically, the present invention is a method to match specific investors to specific traders or traders' systems and to create, or facilitate the creation of, risk controlled investment accounts between those specific investors and specific traders or traders' systems.

BACKGROUND OF THE INVENTION

Investors often seek the expertise of experienced, proven traders in order to take advantage of:
  1. Favorable trading track records.
  2. A like-mindedness in investment practice (e.g. level of risk tolerance).

Track records of traders are generally available from websites that offer the services of traders, in some cases allowing the investor to select a trader to manage an investor's money or a trading system to copy or "mirror" trading activities, or opening an account that will mirror the trader or trader's trading activity. In some cases the level of risk (risk of loss) tolerance is requested from the investor only in broad terms (if at all) and expressed as a general category, such as "low risk", "medium risk", or "high risk", or an arbitrary numerical scale, such as "1, 2, . . . 10", with the inverse opportunities for return. This translates to inexact expectations, no precise degree of risk control, often disappointing results—and the possibility of a disastrous outcome with large losses. In other cases, an exact percentage of risk can be selected, but the selection never includes an option for a precise percentage of guarantee to cover (reimburse) that loss. Thus, investor's have always been exposed to some degree of loss; there is no mechanism to transfer that risk and, therefore, no possibility for complete risk control. Investors have had no systematized or automated way of seeking above-average returns in conjunction with expert, proven traders within a truly risk-controlled investing environment. Risk of loss exists with all investments. However, the risk can be controlled or even eliminated by transferring the risk to parties that are willing to accept it. In this way, both risk averse investors and speculative investors can be accommodated. Concurrently, traders often seek additional capital with which to invest, thereby multiplying their potential for favorable returns and to grow their businesses.

In conclusion, there remains a need for an automated system that intelligently matches and addresses the needs of all types of investors—conservative, moderate, and aggressive—as well as the needs of traders; providing an environment and investment accounts that strictly adhere to the investor's specific investing criteria, primarily level of risk tolerance including an option for a guarantee against losses and the inversely proportional potential for rewards, and concurrently provides a source of investor capital to traders. The present invention described herein addresses these needs, effectively creating a novel investment marketplace operating on the Internet that intelligently matches investors and traders in a mutually beneficial manner.

DETAILED DESCRIPTIONS OF THE INVENTION

All illustrations of the drawings are for the purpose of describing selected versions of the present invention and are not intended to limit the scope of the present invention.

The present invention is an Internet-based software application that matches investors to certain traders or traders' systems in order to create, or facilitate the creation of, risk controlled investment accounts. Investors are individuals or firms committing money to an investment vehicle, and traders are individuals or firms buying and selling an investment product using their own money or another's money. The present invention provides investors with the means to identify a suitable trader with compatible investment goals and practices and with the means to manage the risk of loss. In order to access the present invention, an investor should setup an investor account on the present invention, and a trader should setup a trader account on the present invention. The Internet-based software application is capable of managing a plurality of investor accounts and a plurality of trader accounts, which is necessary because multiple investors and multiple traders can be using the Internet-based software application at the same time.

Figure 1:
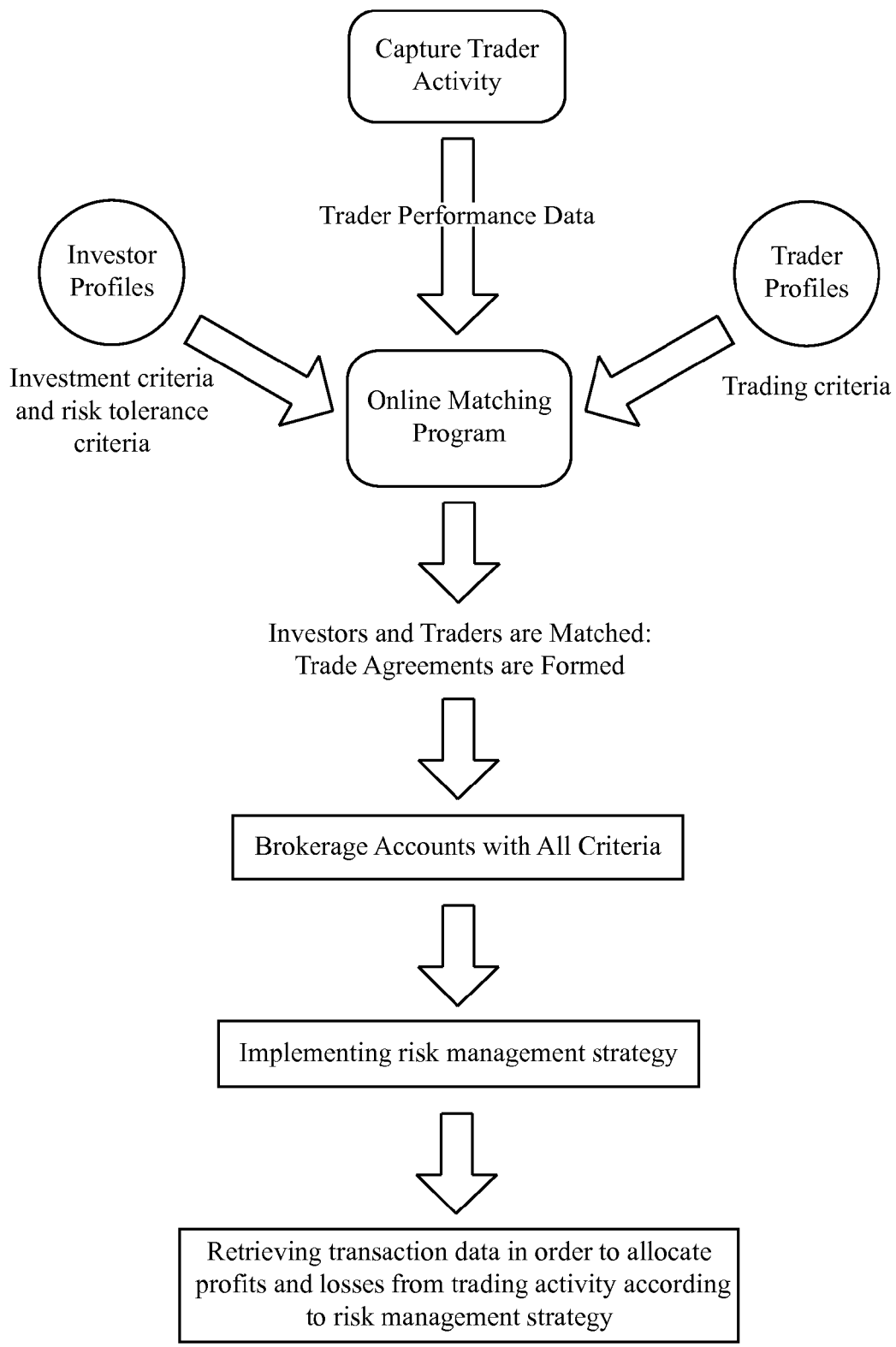
FIG. 1 is a schematic illustrating the overall process followed by the present invention, which is used to match specific investors to specific traders.

As can be seen in FIG. 1, the present invention follows an overall process in order to match investors to certain traders. First, the Internet-based software application should be provided with a plurality of investor accounts and a plurality of trader accounts so that the Internet-based software application can recognize which entities need to be matched to each other. In addition, the Internet-based software application continuously records the performance data of each of the trader accounts. The performance data is used to describe a particular trader's track record is in terms of profits and losses on investments. The process continues by retrieving an investor profile from each of the investor accounts and by retrieving a trader profile from each of the trader accounts. The investor profile contains information that is specific to a particular investor account and allows that particular investor account to differentiate itself from the rest of the investor accounts. The investor profile includes information such as investment criteria and risk-tolerance criteria. Investment criteria describe how a particular investor wants to invest their money, and the risk-tolerance criteria describe how aggressively the particular investor is willing to risk their money. Similarly, the trader profile contains information that is specific to a particular trader account and allows that particular trader account to differentiate itself from the rest of the trader accounts. The trader profile includes trading criteria, which is information such as the method and style of trading, details of how trading is conducted, drawdown level, etc. The trading criteria essentially describe what aspects of the investment criteria and the risk-tolerance criteria that the particular trader is suited to accommodate.

In order to match a particular investor to a suitable trader, the present invention executes a set of compatibility algorithms, which compiles a list of high-incidence matches for a particular investor account. The compatibility algorithms can have a number of different variations to match the investor accounts to certain trader accounts, but, in the preferred embodiment, the present invention uses the investment criteria and the risk-tolerance criteria of each investor account and the criteria of each trader account in order to match and compile the list of high-incidence matches. The Internet-based software application proceeds to prompt, or otherwise offer the opportunity for, the particular investor account to select a chosen trader(s) account from the list of high-incidence matches. The present invention will then display the performance data and the trader profile of the chosen trader account to the particular investor account so that the investor can view the chosen trader's information before formally engaging with or activating actual trading activity with the trader or trader's system. If the investor chooses a trader(s) or traders system(s), then the present invention will effectively create a trade agreement between the particular investor account and the chosen trader account, adhering to the investment criteria and the risk-tolerance criteria of the particular investor account and the trading criteria of the chosen trader account.

The Internet-based software application will prompt the particular investment account to setup an investment fund, if the investment fund has not been previously setup, which will be instructed by the Internet-based software application to follow the investor's criteria. The investment fund will be directed by the chosen trader account to commence in trading activity, which includes completing a number of financial transactions with the goal of making a profit with the investment fund. The present invention will allow trading activity with the investment fund in one of two ways: either the present invention will allow the chosen trader account to directly access the investment fund and to use the investment fund during the trading activity or the present invention will allow a separate service to replicate the trading activity of the chosen trader account with the investment fund. The overall process continues by implementing a risk management strategy for the particular investor account. In addition, the present invention will receive transaction data on the investment fund, which describes profits being deposited into and losses being withdrawn from the investment fund during the trading activity. The present invention receives the transaction data in order to proportionately allocate the profits and the losses between the particular investor account and the chosen trader account during and after the trading activity.

Figure 2:
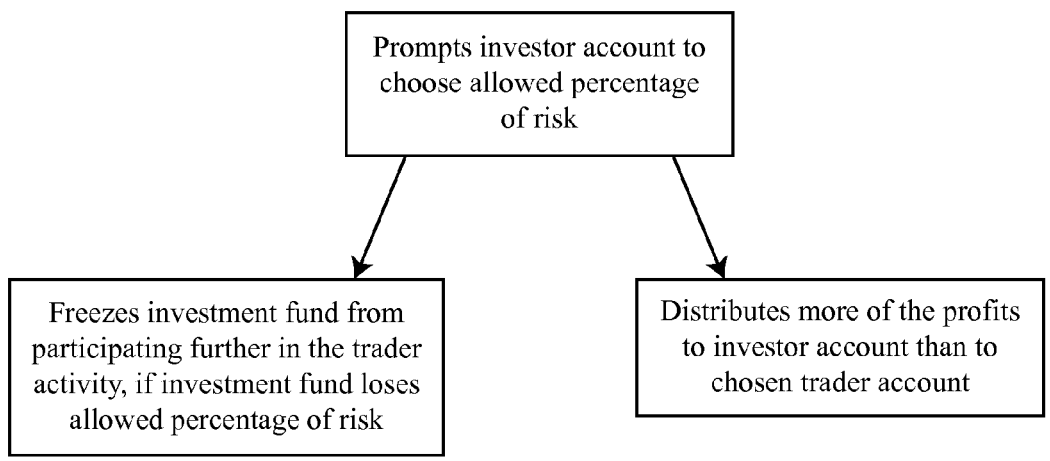
FIG. 2 is a flow chart illustrating the steps of the risk-control embodiment of the risk management strategy.

The risk management strategy can have a number of different embodiments, which include the risk-control embodiment, the risk-control-with-pooling embodiment, the risk-transfer embodiment, and the risk-transfer-with-pooling embodiment. As can be seen in FIG. 2, the risk-control embodiment begins by prompting the particular investor account to choose an allowed percentage of risk for the investment fund. The allowed percentage of risk is the maximum amount of money that can be lost from the investment fund during the trading activity. If the investment fund loses the allowed percentage of risk, the present invention freezes the investment fund from participating in any further trading activity. For example, if an investor creates an investment fund of $10,000.00 and sets the allowed percent of risk at 20%, then the present invention would freeze the investment fund from any other trading activity once the investment fund dropped to $8,000.00. In addition, if the trading is profitable, the present invention will distribute more of the profits to the particular investor account than the chosen trader account because the particular investor account takes on 100% of the risk of losing money in the risk-control embodiment. For example, the particular investor account will receive 80% of the profits from the trading activity, and the chosen trader account will receive only 20% of the profits from the trading activity.

Figure 3:
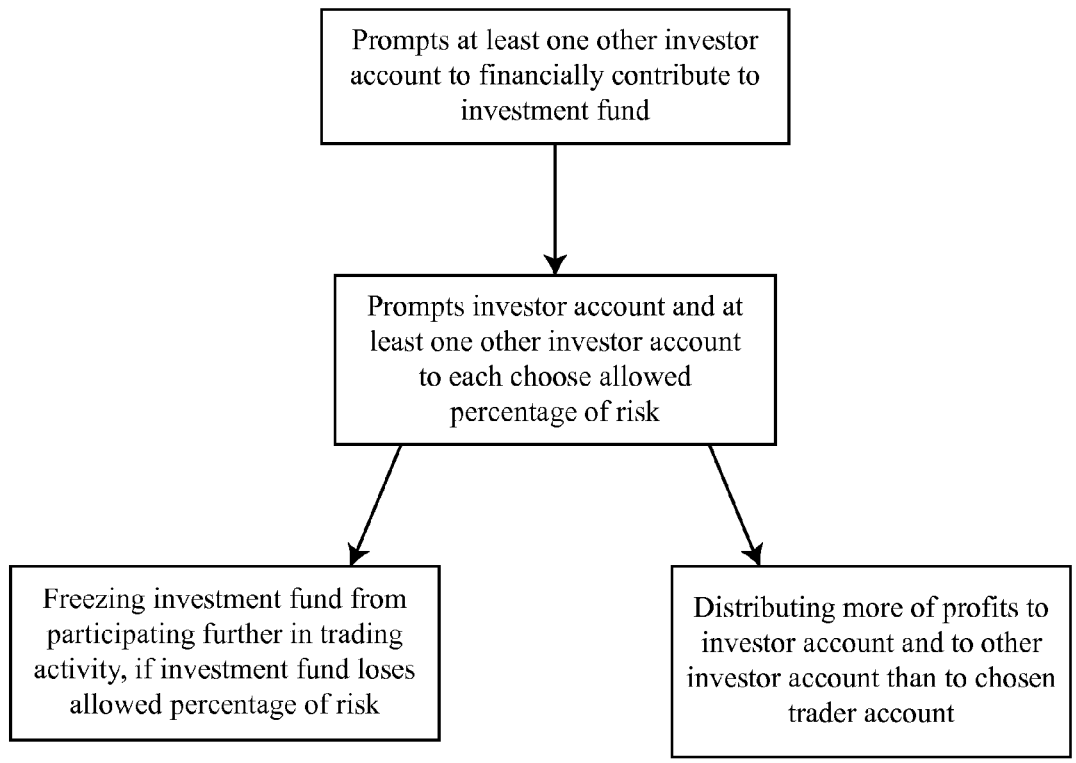
FIG. 3 is a flow chart illustrating the steps for the risk-control-with-pooling embodiment of the risk management strategy.

The risk-control-with-pooling embodiment is illustrated in FIG. 3 and is similar to the risk-control embodiment. However, in this embodiment, more than one investor account is contributing to the investment fund. The risk-control-with-pooling embodiment begins by prompting at least one other investor account from the plurality of investor accounts on the Internet-based software application to financially contribute to the investment fund. These investor accounts have the same risk tolerance criteria indicated in their investor profiles, or the present invention will prompt the particular investor account and the at least one other investor account to agree upon an allowed percentage of risk in the investment fund. Similarly, as in the previous embodiment, if the investment fund financially loses the allowed percentage of risk, the present invention freezes the investment fund from participating in any further trading activity. In addition, the present invention will distribute more of the profits to the particular investor account and to the at least one other investor account than to the chosen trader account because the particular investor account and the at least one other investor account take on the risk of losing money in the risk-control-with-pooling embodiment. The present invention should also proportionally distribute the profits between the particular investor account and the at least one other investor account based on their contribution ratio to the investment fund. For example, if the particular investor account contributed $20,000.00 to the investment fund and the at least one other investor account contributed $10,000.00 to the investment fund, then the contribution ratio between the particular investor account and the at least one other investor account is 2 to 1. Thus, the portion of the profits allocated to the investor accounts is divided between the particular investor account and the at least one other investor account by a 2 to 1 ratio.

Figure 4:
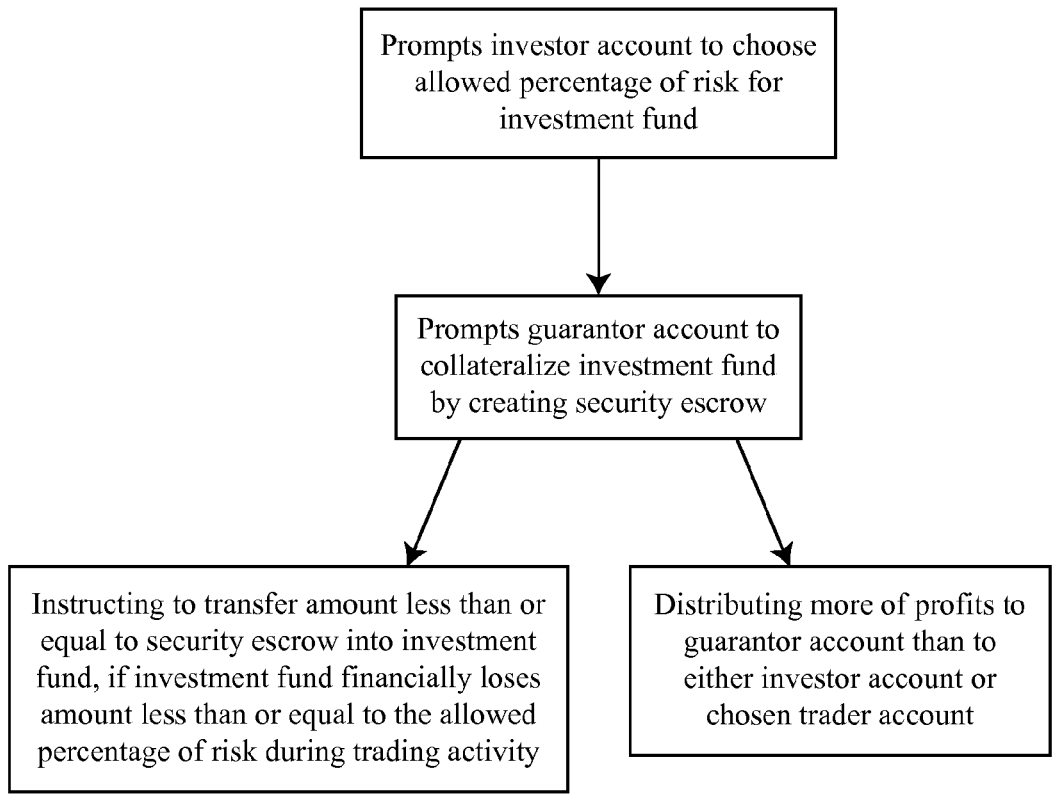
FIG. 4 is a flow chart illustrating the steps for the risk-transfer embodiment of the risk management strategy.
Figure 6:
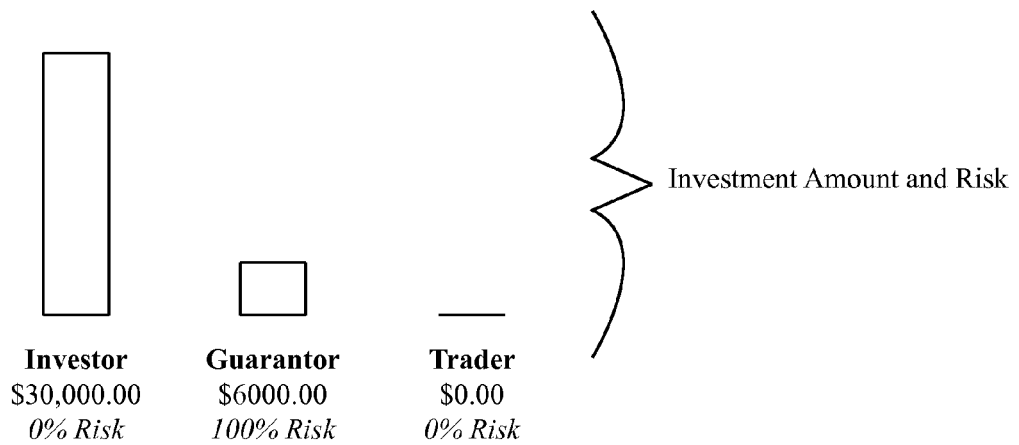
FIG. 6 is an example of the risk-transfer embodiment and illustrates the proportional relation between risk percentage and profit distribution for the investor, the guarantor, and the trader.
Figure 6:
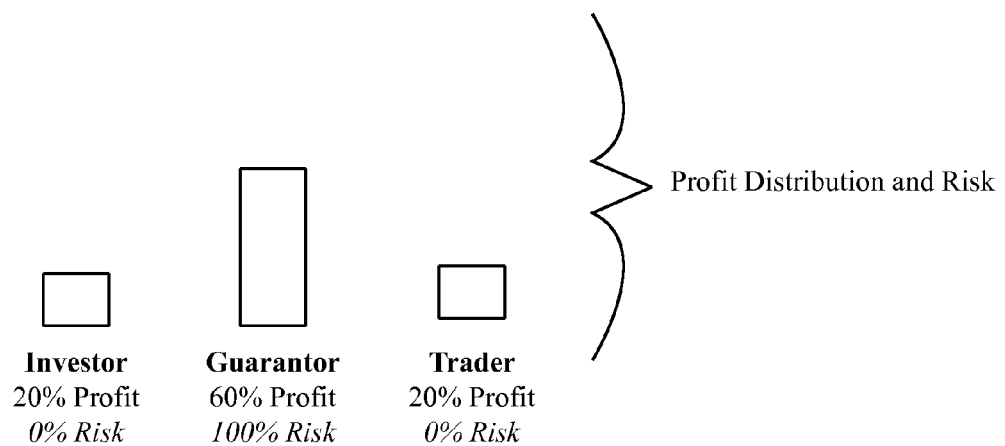
Figure 7:
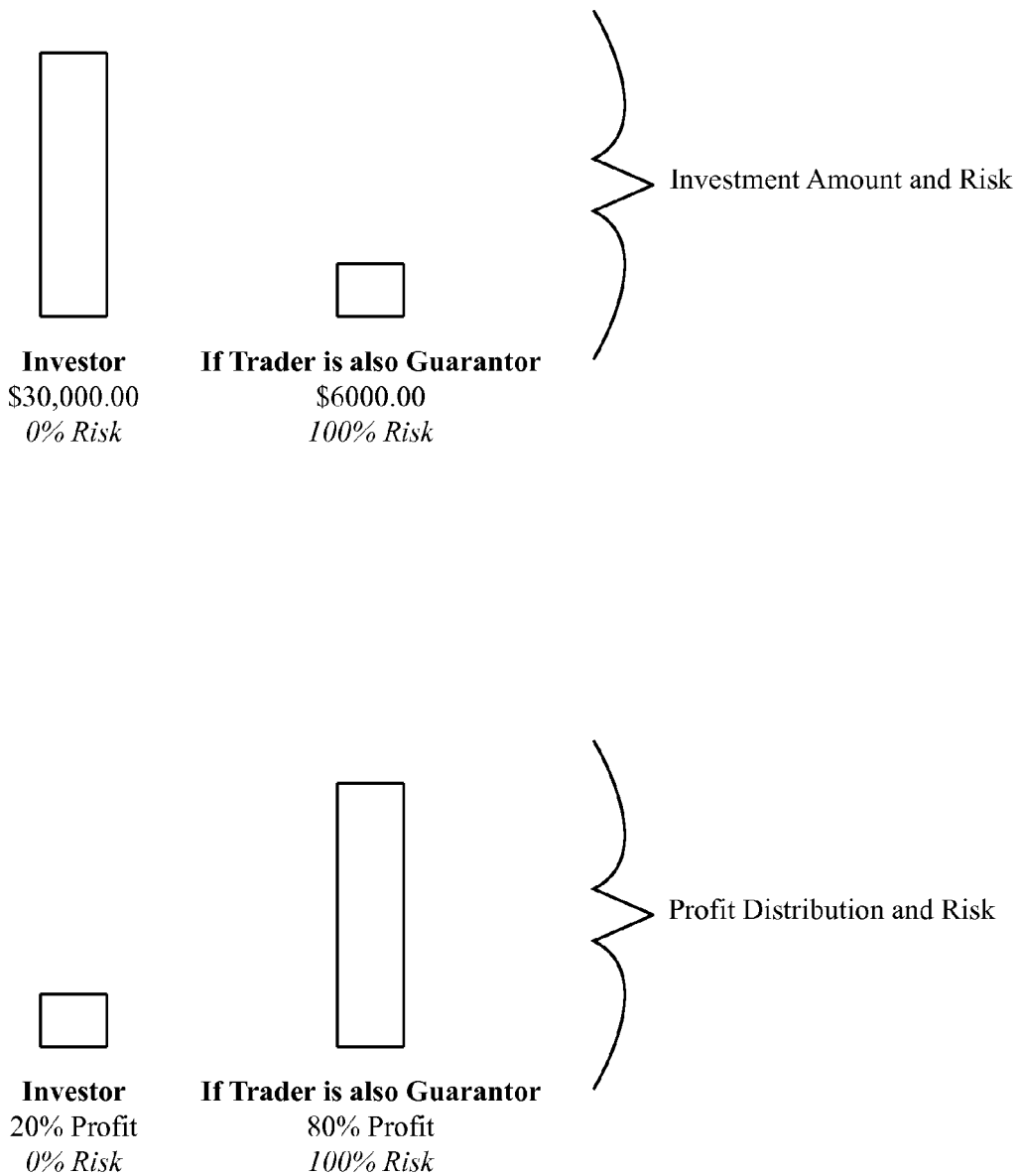
FIG. 7 is another example of the risk-transfer embodiment and illustrates the proportional relation between risk percentage and profit distribution for the investor and the trader (if the trader was the guarantor).
Figure 9:
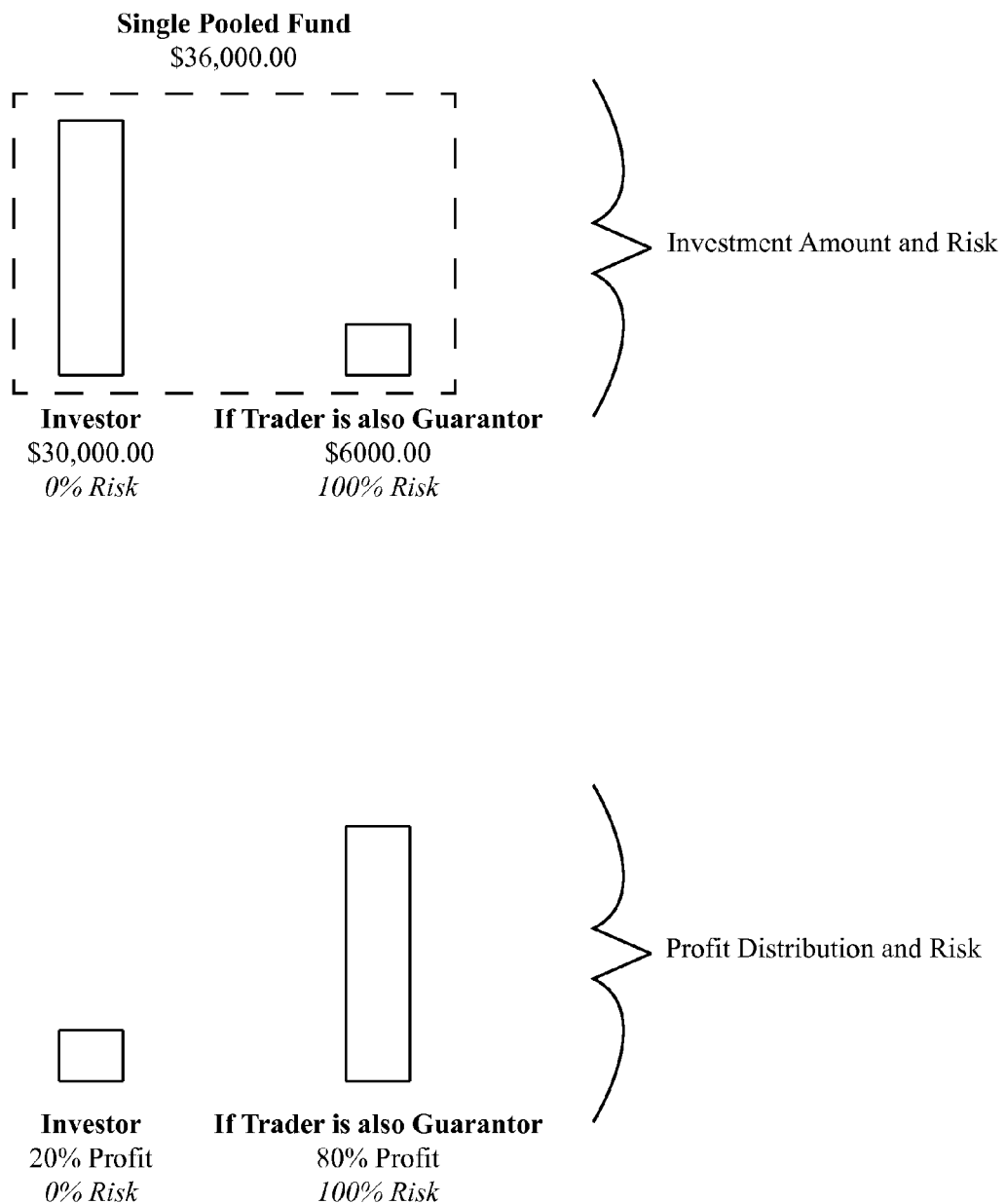
FIG. 9 is another example of the risk-transfer-with-pooling embodiment and illustrates the proportional relation between risk percentage and profit distribution for the investor and the trader (if the trader was the guarantor).

As can be seen in FIG. 4, the risk-transfer embodiment of the risk management strategy eliminates the risk of losing money for the particular investor account. Naturally, there is possibility that real world circumstances such as human error, hardware failure, network failure, acts of god, etc. may compromise the efficiency of the present invention's ability to function and, thus, compromise the complete elimination of all risk. The risk-transfer embodiment begins by prompting the particular investor account to choose the allowed percentage of risk for the investment account or fund. This percentage of the investment fund will be guaranteed against loss and will be reimbursed if lost to the investor by a guarantor account. After the present invention displays the allowed percentage of risk and the investment fund to a guarantor(s) account, the present invention will prompt the guarantor(s) account to collateralize the investment fund by creating a security escrow or similar instrument. Alternatively, the present invention allows the guarantor account to create a security escrow for a certain amount and allows other investor accounts to search for and matched with a guarantor account with that certain amount. The guarantor account can be either an investor account or a trader account as can be seen in FIGS. 7 and 9 and creates the security escrow in order to cover all of the losses on the investment fund up to the allowed percentage of risk. Therefore, if the investment fund financially loses the allowed percentage of risk during the trading activity, then the present invention will instruct the transfer of security escrow into the investment fund and freeze the investment fund from participating in any further trading activity. In the example shown in FIG. 6, if the particular investor account put $30,000.00 in the investment fund and chose an allowed percentage of risk of 20%, then the guarantor account would create a security escrow of $6000.00. Furthermore, if the investment fund dropped to $24,000.00 during the trading activity, then the present invention would instruct the transfer of the security escrow of $6000.00 into the investment fund and freeze the investment fund from any trading activity. In another instance, if the investment fund loses less money than the allowed percentage of risk after the trading activity, then the present invention will transfer the amount of money lost after the trading activity from the security escrow into the investment fund. In addition, the present invention will distribute more of the profits to the guarantor account than to either the particular investor account or the chosen trader account because the guarantor account takes on 100% of the risk of losing money in the risk-transfer embodiment. For example, the particular investor account would receive 20% of the profits from the trading activity, the chosen trader account would receive 20% of the profits from the trader activity, and the guarantor account would receive 60% of the profits from the trader activity. The benefits of the risk-transfer embodiment are that an investor can invest money and limit their risk of financial losses by transferring that risk to a guarantor and that the guarantor can leverage an investment with the opportunity to receive the greatest share of the profits from an account larger than the amount they are investing.

Figure 5:
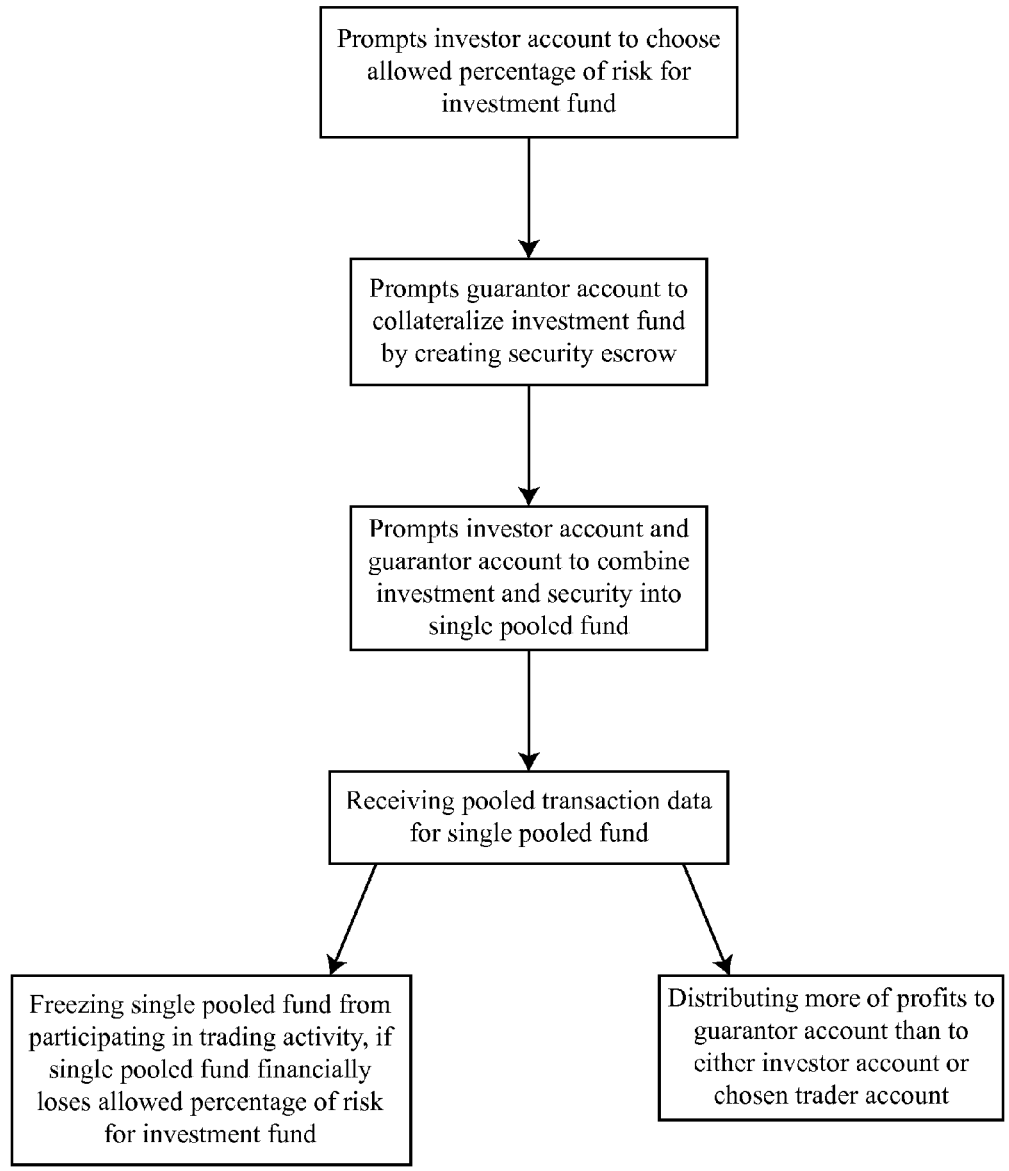
FIG. 5 is a flow chart illustrating the steps for the risk-transfer-with-pooling embodiment the risk management strategy.
Figure 8:
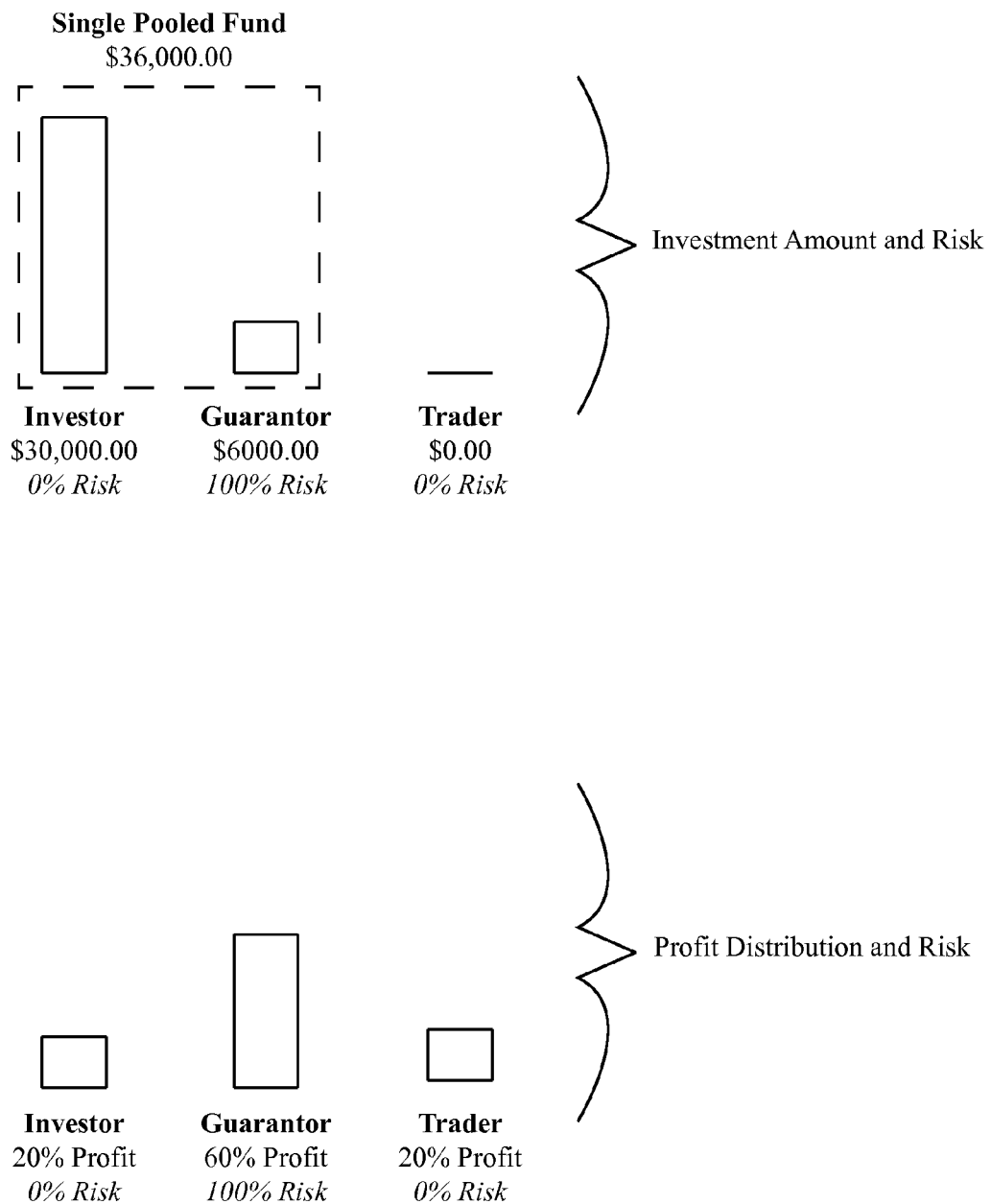
FIG. 8 is an example of the risk-transfer-with-pooling embodiment and illustrates the proportional relation between risk percentage and profit distribution for the investor, the guarantor, and the trader.

As can be seen in FIG. 5, he risk-transfer-with-pooling embodiment of the risk management strategy also eliminates the risk of losing money for the investor account but could return a larger profit. Again, there is possibility that real world circumstances such as human error, hardware failure, network failure, acts of god, etc. may compromise the efficiency of the present invention's ability to function and, thus, compromise the complete elimination of all risk. Similar to the risk-transfer embodiment, the risk-transfer-with-pooling embodiment will begin by prompting the particular investor account to choose the allowed percentage of risk for the investment fund. Again, the present invention allows the guarantor account to collateralize the investment fund by creating a security escrow. The primary difference between the two embodiments is that the risk-transfer-with-pooling embodiment will prompt the particular investor account and the guarantor account to combine the investment fund and the security escrow into a single pooled fund. The single pooled fund allows the present invention to facilitate the distribution of profits and losses in proportion to the amounts invested and risk percentages. The single pooled fund is beneficial because the combined total amount of money from both the investment fund(s) and the security escrow(s) would yield a larger profit than the individual investment fund by itself. From the aforementioned example in the risk-transfer embodiment, the particular investor account, the guarantor account, and the chosen trader account are earning profits from only an investment fund of $30,000.00. For the risk-transfer-by-pooling embodiment, the example shown in FIG. 8 would allow the particular investor account, the guarantor account, and the chosen trader account to earn profits on a single pooled fund of $36,000.00. In addition, the present invention will receive pooled transaction data on the single pooled fund, which describes profits being deposited into and losses being withdrawn from the single pooled fund during the trading activity. The present invention receives the transaction data in order to proportionately allocate the profits and the losses between the particular investor account, the guarantor, and the chosen trader account during and after the trading activity. The present invention will also be able to freeze the single pooled fund from participating in any further trading activity if the single pooled fund financially loses the allowed percentage of risk for the investment fund. For example, if the single pooled fund of $36,000.00 lost $6000.00 during the trading activity, then the present invention would freeze the single pooled fund. Likewise to the risk-transfer embodiment, the risk-transfer-with-pooling embodiment will distribute more of the profits from the trading activity to the guarantor account than to either the particular investor account or the chosen trader account.

For both the risk-transfer embodiment and the risk-transfer-with-pooling embodiment, it is important to note that one investment fund can be collateralized by multiple guarantor accounts, each with their own security escrow. The profit distribution between the multiple guarantor accounts would be proportional to the amount within each of their security escrows. It is also important to note that multiple investor accounts can contribute to one investment fund. The profit distribution between multiple investor accounts would be proportional the amount that each investor contributed to the one investment fund.

Although the invention has been explained in relation to its preferred embodiment, it is to be understood that many other possible modifications and variations can be made without departing from the spirit and scope of the invention as hereinafter claimed.

What is claimed is:

1. A non-transitory computer-readable medium that stores instructions executable by one or more processors to perform a method for matching investors and traders to create risk controlled investment accounts comprising:

instructions for providing a plurality of investor accounts and a plurality of trader accounts;

instructions for continuously recording performance data for each of said plurality of trader accounts;

instructions for retrieving an investor profile from each of said plurality of investor accounts, wherein said investor profile includes investment criteria and risk-tolerance criteria;

instructions for retrieving a trader profile from each of said plurality of trader accounts, wherein said trader profile includes trading criteria;

instructions for executing a set of compatibility algorithms in order to compile a list of high-incidence matches for a particular investor from said plurality of investor accounts;

instructions for prompting said particular investor account to select a chosen trader account from said list of high-incidence matches;

instructions for displaying said performance data and said trader profile of said chosen trader account to said particular investor account;

instructions for brokering a trade agreement between said particular investor account and said chosen trader account in order to meet said investment criteria and said risk-tolerance criteria of said particular investor account and to meet said trading criteria of said chosen trader account;

instructions for prompting said particular investor account to create an investment fund for trading activity; and instructions for implementing a risk management strategy for said particular investor account, wherein said risk management strategy could include an allowed percentage of risk, a guarantor account, a security escrow, and a single pooled fund;

instructions for retrieving transaction data for said investment fund in order to proportionately allocate profits and losses from said trading activity between said particular investor account and said chosen trader account, wherein said transaction data includes said profits being deposited into and said losses being withdrawn from said investment fund.

2. The non-transitory computer-readable medium that stores instructions executable by one or more processors to perform a method for matching investors and traders to create risk controlled investment accounts of claim 1 comprising:

instructions for prompting said particular investor account to choose said allowed percentage of risk for said investment fund;

instructions for freezing said investment fund from participating further in said trader activity, if said investment fund loses said allowed percentage of risk; and instructions for distributing more of said profits to said particular investor account than to said chosen trader account.

3. The non-transitory computer-readable medium that stores instructions executable by one or more processors to perform a method for matching investors and traders to create risk controlled investment accounts of claim 1 comprising:

instructions for prompting at least one other investor account from said plurality of investor accounts to financially contribute to said investment fund;

instructions for prompting said particular investor account and said at least one other investor account to each choose said allowed percentage of risk for said investment fund;

instructions for freezing said investment fund from participating further in said trading activity, if said investment fund financially loses said allowed percentage of risk; and instructions for distributing more of said profits to said particular investor account and to said at least one other investor account than to said chosen trader account.

4. The non-transitory computer-readable medium that stores instructions executable by one or more processors to perform a method for matching investors and traders to create risk controlled investment accounts of claim 1 comprising:

instructions for prompting said particular investor account to choose said allowed percentage of risk for said investment fund;

instructions for prompting said guarantor account to collateralize said investment fund by creating said security escrow;

instructions for instructing to transfer less than or equal to said security escrow into said investment fund, if said investment fund financially loses less than or equal to said allowed percentage of risk during said trading activity;

instructions for freezing said investment fund from participating further in said trading activity, if said investment fund financially loses said allowed percentage of risk; and instructions for distributing more of said profits to said guarantor account than to either said particular investor account or said chosen trader account.

5. The non-transitory computer-readable medium that stores instructions executable by one or more processors to perform a method for matching investors and traders to create risk controlled investment accounts of claim 1 comprising:

instructions for prompting said particular investor account to choose said allowed percentage of risk for said investment fund;

instructions for prompting said guarantor account to collateralize said investment fund by creating said security escrow;

instructions for prompting said particular investor account and said guarantor account to combine said investment fund and said security escrow into said single pooled fund;

instructions for retrieving pooled transaction data for said single pooled fund, wherein said pooled transaction data includes said profits being deposited into and said losses being withdrawn from said single pooled fund;

instructions for freezing said single pooled fund from participating in said trading activity, if said single pooled fund financially loses said allowed percentage of risk for said investment fund; and instructions for distributing more of said profits to said guarantor account than either said particular investor account or said chosen trader account.

6. The non-transitory computer-readable medium that stores instructions executable by one or more processors to perform a method for matching investors and traders to create risk controlled investment accounts of claim 1 comprising:

instructions for matching said investment criteria and said risk-tolerance criteria of each of said plurality of investor accounts to said accommodation criteria of each of said plurality of trader account in order to compile said list of high-incidence matches.

7. The non-transitory computer-readable medium that stores instructions executable by one or more processors to perform a method for matching investors and traders to create risk controlled investment accounts of claim 1 comprising:

instructions for enabling said chosen trader account to directly access said investment fund during trader activity.

8. The non-transitory computer-readable medium that stores instructions executable by one or more processors to perform a method for matching investors and traders to create risk controlled investment accounts of claim 1 comprising:

instructions for replicating said trading activity of said chosen trader account with said investment fund.

9. The non-transitory computer-readable medium that stores instructions executable by one or more processors to perform a method for matching investors and traders to create risk controlled investment accounts of claim 1, wherein said guarantor either could be one of the plurality of investor accounts or could be one of the plurality of trader accounts.

\* \* \* \* \*